(12) United States Patent
Strachan et al.

(10) Patent No.: US 11,551,056 B2
(45) Date of Patent: Jan. 10, 2023

(54) STAGED NEURAL NETWORKS FOR SOLVING NP HARD/COMPLETE PROBLEMS

(71) Applicant: Hewlett Packard Enterprise Development LP, Houston, TX (US)

(72) Inventors: John Paul Strachan, Palo Alto, CA (US); Suhas Kumar, Palo Alto, CA (US); Thomas Van Vaerenbergh, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 756 days.

(21) Appl. No.: 16/261,398

(22) Filed: Jan. 29, 2019

(65) Prior Publication Data
US 2020/0242448 A1    Jul. 30, 2020

(51) Int. Cl.
| G06N 3/04 | (2006.01) |
| G06N 3/08 | (2006.01) |
| G06N 3/063 | (2006.01) |

(52) U.S. Cl.
CPC ......... G06N 3/0445 (2013.01); G06N 3/0635 (2013.01); G06N 3/084 (2013.01)

(58) Field of Classification Search
CPC ..... G06N 3/0445; G06N 3/0635; G06N 3/084
See application file for complete search history.

(56) References Cited

U.S. PATENT DOCUMENTS

| 9,875,440 | B1 | 1/2018 | Commons | |
| 10,482,875 | B2* | 11/2019 | Henry | G06N 3/0445 |
| 10,911,266 | B2* | 2/2021 | Cao | H04L 25/0254 |
| 2018/0101784 | A1* | 4/2018 | Rolfe | G06K 9/00986 |
| 2018/0165854 | A1* | 6/2018 | Du | G06N 20/00 |
| 2020/0218967 | A1* | 7/2020 | Strachan | G06N 3/0635 |
| 2020/0334523 | A1* | 10/2020 | Kumar | G06N 3/0635 |

OTHER PUBLICATIONS

Caravelli et al., "Memristors for the Curious Outsiders", Dec. 8, 2018, MDPI, pp. 1-43. (Year: 2018).*
Sheridan et al., "Sparse Coding with Memristor Networks", May 22, 2017, Nature Nanotechnology, pp. 784-790 (Year: 2017).*
(Continued)

*Primary Examiner* — Paulinho E Smith
(74) *Attorney, Agent, or Firm* — Sheppard Mullin Richter & Hampton LLP

(57) ABSTRACT

Staged neural networks and methods are described herein. In some embodiments, the methods may identify a plurality of second NP hard/complete problems that are similar to the first NP hard/complete problem and identify solutions to the second NP hard/complete problems. The methods may train a deep neural network with the second NP hard/complete problems and the solutions. The methods may provide the first NP hard/complete problem to the trained deep neural network to generate a preliminary solution to the first NP hard/complete problem and provide the preliminary solution to a recursive neural network configured to execute an energy minimization search. The recursive neural network may generate a final solution to the problem based on the preliminary solution.

17 Claims, 7 Drawing Sheets

(56) References Cited

OTHER PUBLICATIONS

Shimeng Yu, "Neuro-Inspired Computing With Emerging NonVolatile Memory", IEEE, Feb. 2018, vol. 106 No. 2, pp. 260-285 (Year: 2018).*
Hu et al., "Associative Memory Realized by a Reconfigurable Memristive Hopfield Neural Network", Aug. 30, 2014, Nature Communications, pp. 1-8 (Year: 2014).*
Bayat et al., "Implementation of Multilayer Perceptron Network with Highly Uniform Passive Memristive Crossbar Circuits", Nature Communications, 2018, pp. 1-7 (Year: 2018).*
Mohammed at al., "Utilizing Hopfield Neural Networks and an Improved Simulated Annealing Procedure for Design Optimization of Electromagnetic Devices", Nov. 1993, IEEE Transactions of Magnetics, vol. 29 No. 6, pp. 2404-2406 (Year: 1993).*
Milan et al., "Data-Driven Approximations to NP-Hard Problems", 2017, AAAI, pp. 1-7 (Year: 2017).*
Raghavendra, "Approximating NP-hard Problems Efficient Algorithms and their Limits", 2009, pp. 1-314 (Year: 2009).*
Anton Milan et al., "Data-Driven Approximations to NP-Hard Problems," 2017, pp. 1453-1459, AAAI.
Daniel Quang and Xiaohui Xie, "DanQ: A Hybrid Convolutional and Recurrent Deep Neural Network for Quantifying the Function of DNA Sequences," Nucleic Acids Research, Apr. 15, 2016, pp. 1-6, vol. 44, No. 11.
Subhrajit Roy et al., "ChronoNet: A Deep Recurrent Neural Network for Abnormal EEG Identification," May 18, 2018, pp. 1-10, IBM Research, Australia.
Xiaobin Zhang et al., "A Combination of RNN and CNN for Attention-based Relation Classification," 8th International Congress of Information and Communication Technology, May 11, 2018, pp. 911-917, The Authors. Published by Elsevier Ltd.

* cited by examiner

STAGED NEURAL NETWORKS FOR SOLVING NP HARD/COMPLETE PROBLEMS

DESCRIPTION OF RELATED ART

Artificial neural networks are a family of technical models inspired by biological nervous systems, and that are used to estimate or approximate functions represented by complex data inputs. A neural network may be represented as a system of interconnected "neurons" which exchange messages between each other. The connections may have numerical weights that can be tuned based on experience, making neural networks adaptive to inputs and capable of machine learning. Artificial neural networks may have a variety of applications, including function approximation, classification, data processing, robotics, and computer numerical control.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Some neural networks, such as Hopfield neural networks, can be used for solving nondeterministic polynomial-time (NP) hard/complete problems, such as the traveling salesman problem, resource scheduling, and the like. However, these networks are limited by the quality of the initial guesses provided as starting points. To generate these initial guesses, the disclosed technology may employ a deep neural network. The preliminary solution generated by the deep neural network may be used as a starting point for a recursive neural network. The recursive neural network may implement an energy minimization search, for example using a Hopfield network or the like. The recursive networks may include recurrent networks and the like.

One advantage of the staged approach is decreased time necessary to arrive at a solution. Deep neural networks are imprecise, but fast, and therefore are used in the disclosed technology to provide a good preliminary solution. Recursive neural networks are precise, but slow, especially when starting from a poor initial solution. Providing a good preliminary solution reduces the time required by a recursive neural network to achieve a final solution. Using these neural networks in the staged manner described herein reduces the overall time required to arrive at a final solution for a NP hard/complete problem.

Figure 1:
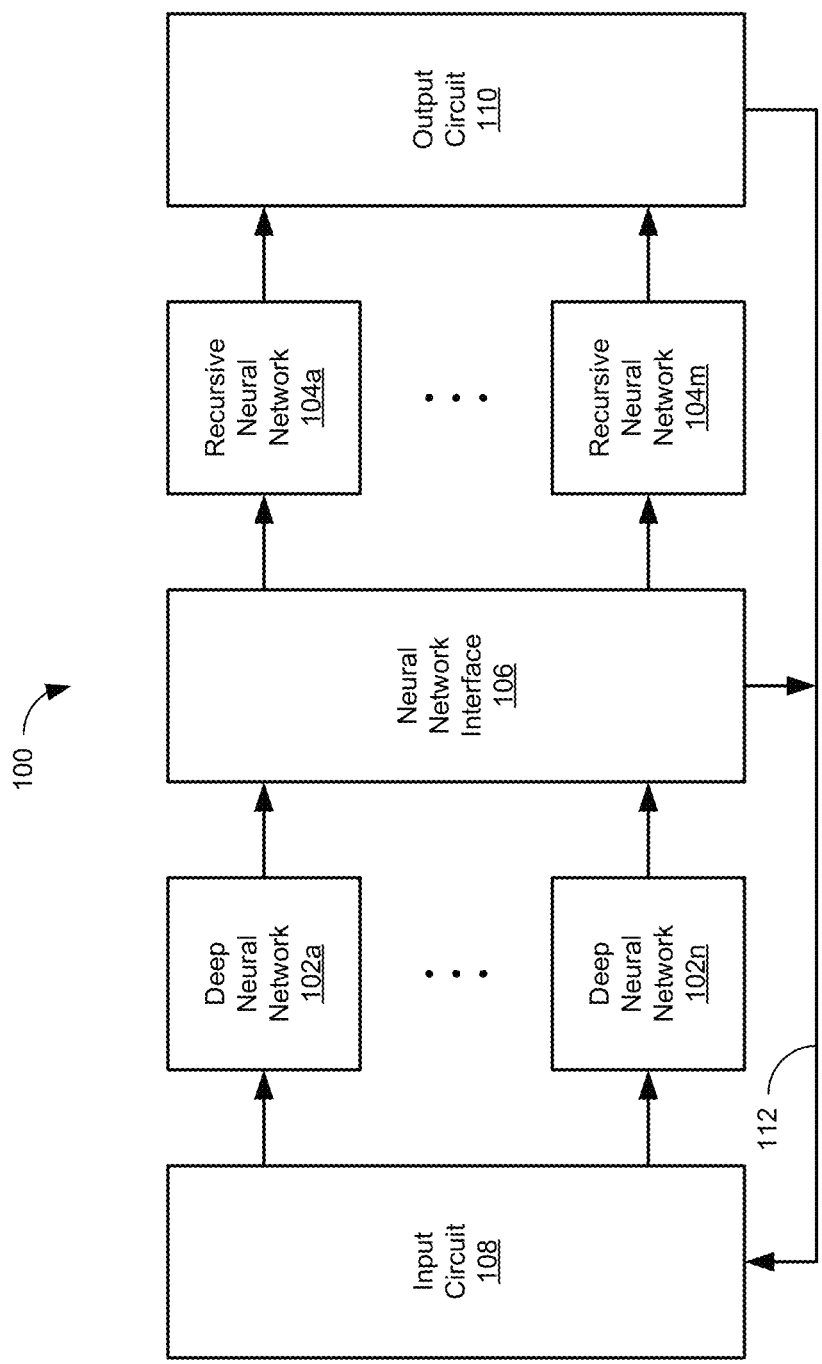
FIG. 1 illustrates a neural network system for solving NP hard/complete problems according to one embodiment of the disclosed technology.

FIG. 1 illustrates a neural network system for solving NP hard/complete problems, according to one embodiment of the disclosed technology. Referring to FIG. 1, the neural network system 100 may include one or more deep neural networks 102a-n. A deep neural network may refer to an artificial neural network having many layers between an input layer and an output layer. The deep neural networks 102 may include application-specific systems, such as face recognition hardware. The deep neural networks 102 may implement a number of algorithms, for example including feed-forward algorithms, inference algorithms, back-propagation algorithms, and the like. The deep neural networks 102 may be based on any hardware platforms, for example such as field-programmable gate arrays (FPGA), graphical processing units (GPU), memristors, integrated photonic circuits, matrix-vector multipliers based on free-space optics, and the like, and combinations thereof.

The neural network system 100 may include an input circuit 108. According to embodiments of the disclosed technology, the input circuit 108 may train the deep neural networks 102 using solved NP hard/complete problems, and the solutions to those problems. After training, the input circuit 108 may provide the deep neural networks 102 with an unsolved NP hard/complete problem that is similar to the solved NP hard/complete problems used to train the deep neural networks, and for which a preliminary solution is desired. Each of the deep neural networks 102 may provide a preliminary solution to the problem.

The neural network system 100 may include a neural network interface 106, and one or more recursive neural networks 104a-n. The recursive neural networks 104 may be implemented as any neural network that can be programmed to accept an input of a matrix representing a Hamiltonian of a NP hard/complete problem, and to iterate towards a solution to the matrix. The recursive neural network 104 may include a Hopfield network, an autoassociative memory, a restrictive Boltzmann machine, an optical Ising machine, and the like, and combinations thereof. The Hopfield network may be implemented as a crossbar array of memory elements. The memory elements may be implemented as memristors or the like. The recursive neural networks may be implemented on hardware platforms including GPUs, complementary metal oxide semiconductor (CMOS) based networks, memristor-based networks, and the like, and combinations thereof.

When the neural network system 100 includes only one deep neural network 102, the neural network interface 106 may program the recursive neural networks 104 with the preliminary solution provided by that deep neural network 102. When the neural network system 100 includes multiple deep neural networks 102, the neural network interface 106 may program the recursive neural networks 104 with one or more of the preliminary solutions, a synthesis of the preliminary solutions, or selected ones of the preliminary solutions. In some embodiments, the deep neural network 102 may provide parameters to sample from a distribution of the preliminary solutions, and the neural network interface 106 may use one or more samples from the distribution to generate preliminary solutions for the recursive neural networks 104. Any of these techniques may be used alone or in combination. The neural network interface 106 may provide one or more initial input vectors to the recursive neural networks 104.

Recursive neural networks 104 may iterate many times to provide a final solution. The recursive neural networks may provide the final solution to an output circuit 110. Input circuit 108, and output circuit 110, may include any circuits needed to interface with the deep neural networks 102, and the recursive neural networks 104, respectively. The circuits may include for example input circuits, output circuits, analog-to-digital converters, digital-to-analog converters, memories, processors, and the like.

In some embodiments, the neural network system 100 includes a feedback loop 112. The feedback loop 112 may provide outputs of the recursive neural network 104 from the output circuit 110 to the input circuit 108. These outputs may include final solutions, other data provided by the recursive neural networks 104, products derived from the final solutions or other data, or any combination thereof. The feedback loop 112 may provide data from the neural network interface 106. These data may include the preliminary solutions, other data provided by the deep neural networks 102, other data provided to the recursive neural networks, products derived from these preliminary solutions and data, or any combination thereof. With this feedback loop 112, the entire neural network system 100, including both deep neural networks 102 and recursive neural networks 104, may iterate as many times as desired to yield an improved final solution.

In such embodiments, the input circuit 108 may provide the feedback data, or products derived therefrom, to the deep neural networks 102. For example, these data may be used in unsupervised training techniques or reinforcement learning, and the like. For instance, in reinforcement learning, an overall figure of merit for the neural network is tracked, and the weights of the neural network are adjusted according to the figure of merit.

In some embodiments, the neural networks in the first stage of the neural network system 100, that is, the deep neural networks 102, may be replaced by other sorts of neural networks. For example, one or more of the deep neural networks 102 may be replaced by a recursive neural network, a feedforward neural network, a reservoir computing network, and the like. One or more of these networks may be implemented in hardware, software, or a combination thereof.

Figure 2:
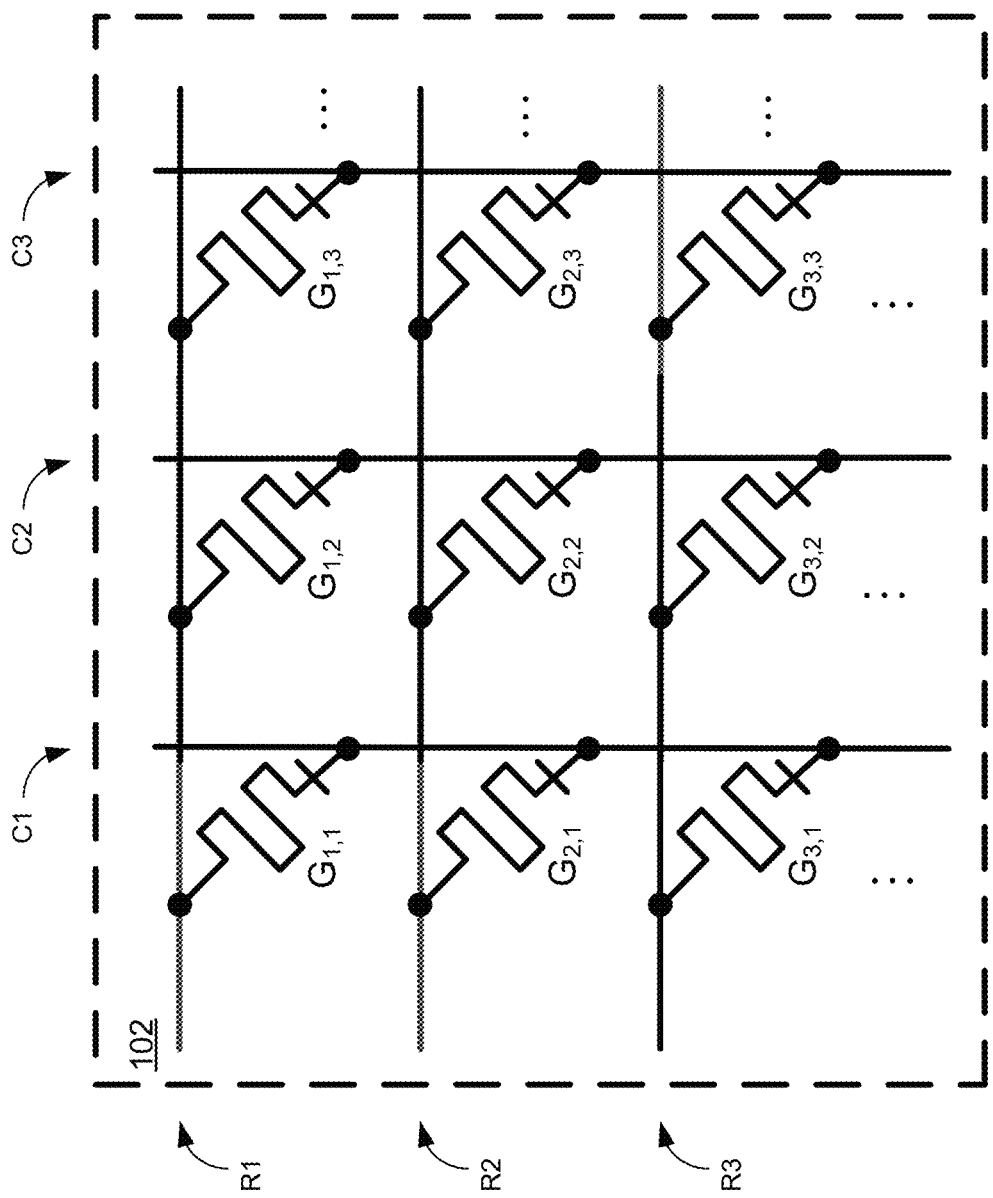
FIG. 2 illustrates a crossbar array according to one embodiment of the disclosed technology.
Figure 3:
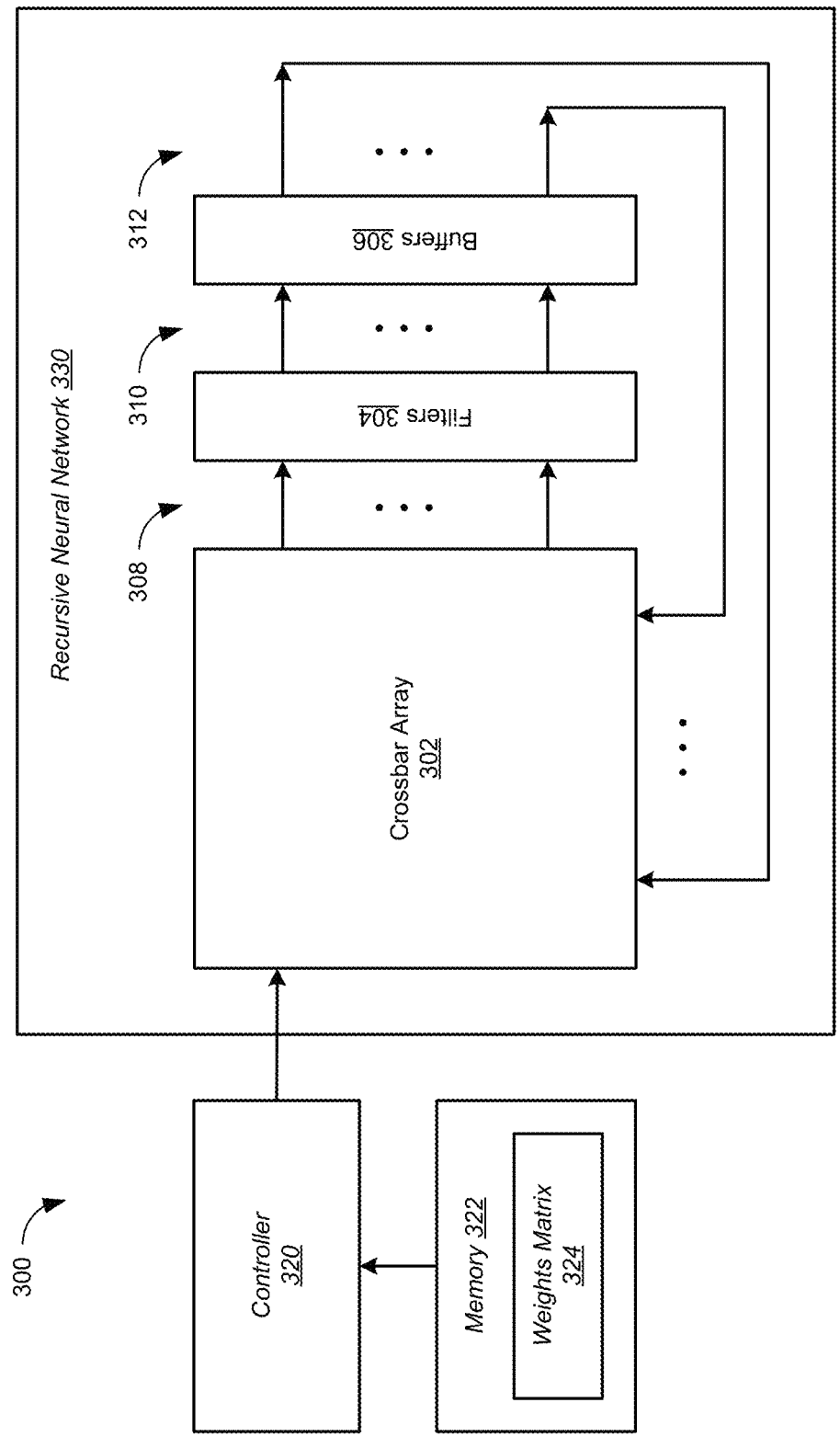
FIG. 3 illustrates a recursive neural network system according to one embodiment of the disclosed technology.

FIG. 2 illustrates a recursive neural network system according to one embodiment of the disclosed technology. Referring to FIG. 2, the recursive neural network system 200 may include a recursive neural network 230. The recursive neural network may include a crossbar array 202. FIG. 3 illustrates a crossbar array 202 according to one embodiment of the disclosed technology. Referring to FIG. 3, the crossbar array 202 includes a plurality of row lines R, with three row lines R1, R2, and R3 shown. The crossbar array 202 also includes a plurality of column lines C, with three column lines C1, C2, and C3 shown. The crossbar array 202 also includes a plurality of memory cells G. Each memory cell G is coupled between a respective combination of one of the row lines R and one of the column lines C. For example, memory cell $G_{1,1}$ is coupled between row line R1 and column line C1. The crossbar array 202 may be of any suitable dimensions.

Prior to operation of the crossbar array 202, a matrix of weights may be stored in the memory cells G. During operation of the crossbar array 202, the column lines C may receive inputs according to an input vector, and each row line may deliver an output representing a dot-product of the input vector and the weights in the row line.

The memory elements G of the crossbar array 202 may be implemented as memristors. Memristors are devices that may be used as components in a wide range of electronic circuits, such as memories, switches, radio frequency circuits, and logic circuits and systems. In a memory structure, a crossbar array of memory devices having memristors may be used. In memory devices, memristors may be used to store bits of information, 2 or 0. The resistance of a memristor may be changed by applying an electrical stimulus, such as a voltage or a current, through the memristor. Generally, at least one channel may be formed that is capable of being switched between two states—one in which the channel forms an electrically conductive path ("on") and one in which the channel forms a less conductive path ("off"). In some other cases, conductive paths represent "off" and less conductive paths represent "on". Furthermore, memristors may also behave as an analog component with variable conductance.

In some applications, a memory crossbar array may be used to perform vector-matrix computations. For example, an input voltage signal from each column line of the crossbar is weighted by the conductance of the resistive devices in each row line and accumulated as the current output from each row line. Ideally, if wire resistances can be ignored, the current (I) flowing out of the crossbar array will be approximately represented in the equation below:

$$I^T = V^T G \qquad (1)$$

where V is the input voltage and G is the conductance matrix.

The memristor crossbar array is configured to include contributions from each memristor in the crossbar array. The use of memristors at junctions or cross-points of the crossbar array enables programming the resistance (or conductance) at each such junction.

Referring again to FIG. 2, the recursive neural network 230 may include one or more filters 204. The filters 204 receive outputs 208 from the row lines R of the crossbar array 202, and generate a new input vector 210 for the crossbar array 202 based on the outputs 208. The filters may be linear or nonlinear, and may include simple filters such as thresholding filters, complex filters such as sigmoid filters, other filters, and combinations thereof.

The recursive neural network 230 may include one or more buffers 206. The buffers 206 store the new input vector 210, and provide signals 212 representing the new input vector 210 to the column lines C of the crossbar array 202.

The recursive neural network system 200 may include a memory 222 to store a weights matrix 224. The weights matrix 224 may represent a problem to be solved. The problem to be solved may include an NP-hard problem such as a traveling salesman problem, Max-cut problem, job or airline scheduling problem, or the like. The problem may be expressed as a matrix representing a Hamiltonian of a NP hard/complete problem.

The recursive neural network system 200 may include a controller 220. The controller 220 may program the weights matrix 224 into the memory elements G of the crossbar array 202. The controller 220 may also perform other functions, such as those described herein. The controller 220 may be implemented as a processor, a dedicated circuit, or the like, or combinations thereof.

Figure 4:
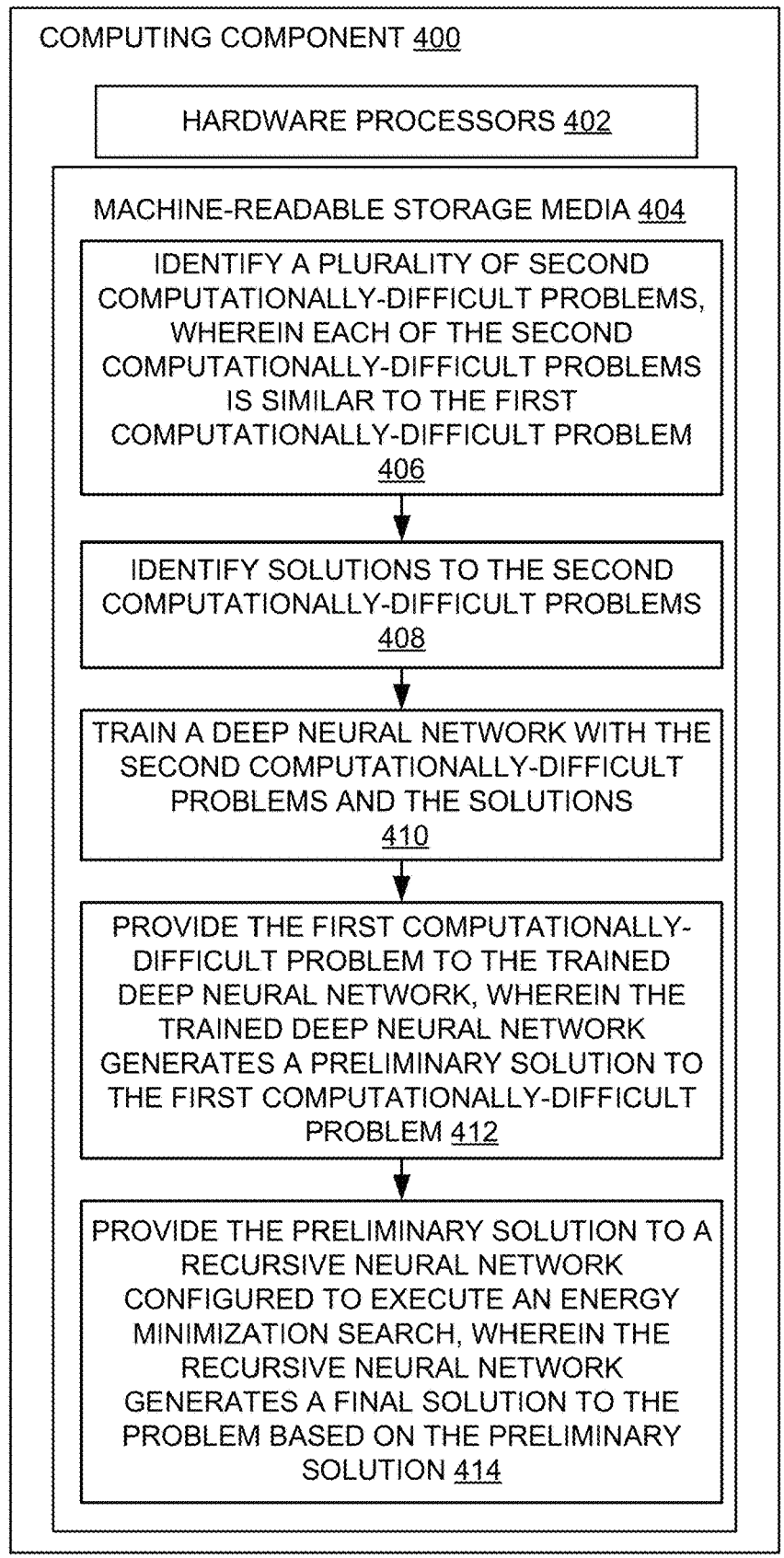
FIG. 4 is a block diagram of an example computing component or device for solving NP hard/complete problems using staged neural networks in accordance with one embodiment.

FIG. 4 is a block diagram of an example computing component or device 400 for solving NP hard/complete problems, using staged neural networks in accordance with one embodiment. Computing component 400 may be, for example, a server computer, a controller, or any other similar computing component capable of processing data. In the example implementation of FIG. 4, the computing component 400 includes a hardware processor, 402, and machine-readable storage medium, 404. In some embodiments, computing component 400 may be an embodiment of the input circuit 108, the neural network interface 106, or any combination thereof.

Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-414, to control processes or operations for solving NP hard/complete problems using staged neural networks. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-414.

Hardware processor 402 may execute instruction 406 to identify a plurality of second NP hard/complete problems, wherein each of the second NP hard/complete problems is similar to the first NP hard/complete problem for which a solution is desired. Hardware processor 402 may execute instruction 408 to identify solutions to the second NP hard/complete problems. Hardware processor 402 may execute instruction 410 to train the deep neural network 102 with the second NP hard/complete problems and their solutions. This supervised learning technique may be used to train the deep neural network 102 to find patterns, trends, and heuristics relating to these problems and their solutions.

Hardware processor 402 may execute instruction 412 to provide the first NP hard/complete problem to the trained deep neural network, wherein the trained deep neural network generates a preliminary solution to the first NP hard/complete problem. The preliminary solution should be a good first guess to the first NP hard/complete problem. The neural network interface 106 may test the preliminary solution against target criteria to determine whether the process should proceed with that preliminary solution. When the preliminary solution does not meet that target criteria, it may be discarded, and a new preliminary solution generated. When the preliminary solution meets the target criteria, it may be provided to the recursive neural networks 104.

Figure 5:
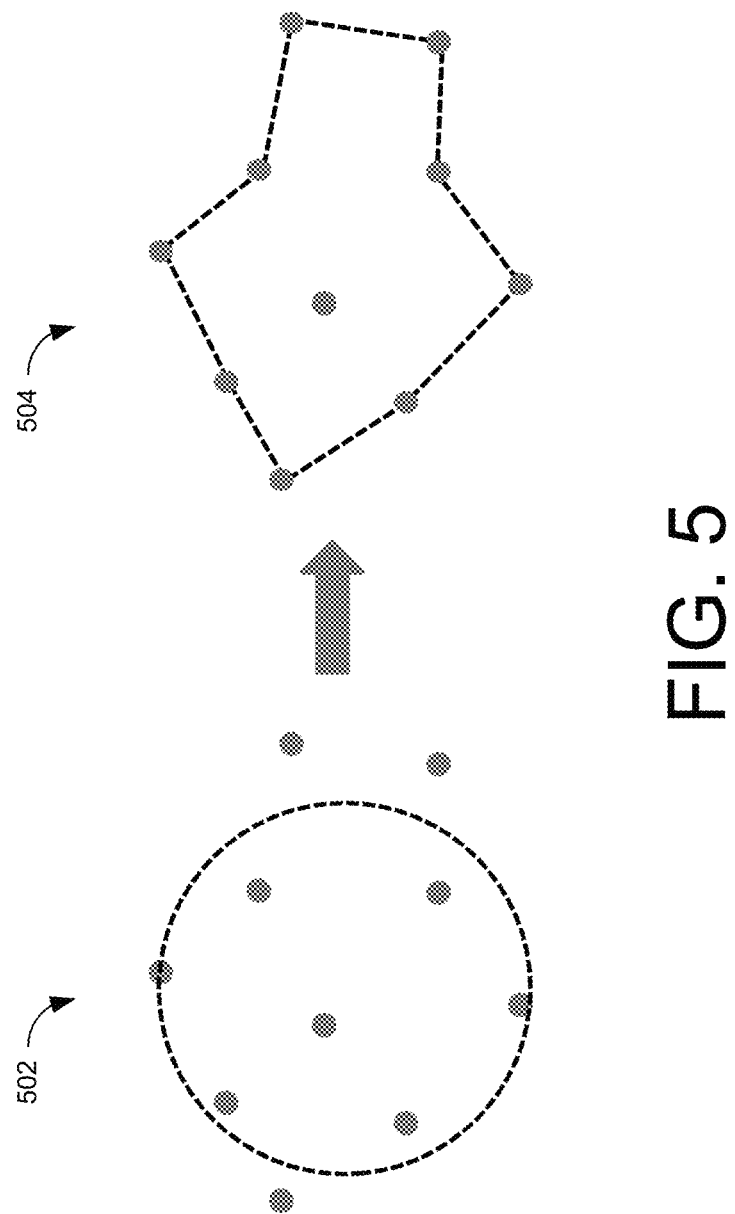
FIG. 5 illustrates an example preliminary solution provided by a deep neural network fora traveling sales problem according to one embodiment of the disclosed technology.

FIG. 5 illustrates an example preliminary solution provided by a deep neural network for a traveling sales problem according to one embodiment of the disclosed technology. Referring to FIG. 5, a 10-city traveling salesman problem is illustrated. Each city is depicted as a dot. The desired solution is the shortest round-trip journey that traverses each city. An initial solution is depicted by dashed lines at 502. The initial solution is a circle connecting only two of the cities. This not a very good solution, but provides an adequate starting point for a deep neural network. A preliminary solution provided by a deep neural network is depicted at 504. This is a fairly good solution, failing to traverse only one of the 10 cities.

Hardware processor 402 may execute instruction 414 to provide the preliminary solution to a recursive neural network configured to execute an energy minimization search, wherein the recursive neural network generates a final solution to the problem based on the preliminary solution. The energy minimization search may include a classical annealing search. The energy minimization search may include other techniques instead of, or in addition to, a classical annealing search, for example such as simulated annealing adiabatic annealing, bit slicing, constraint imposition, and the like, and combinations thereof.

Figure 6:
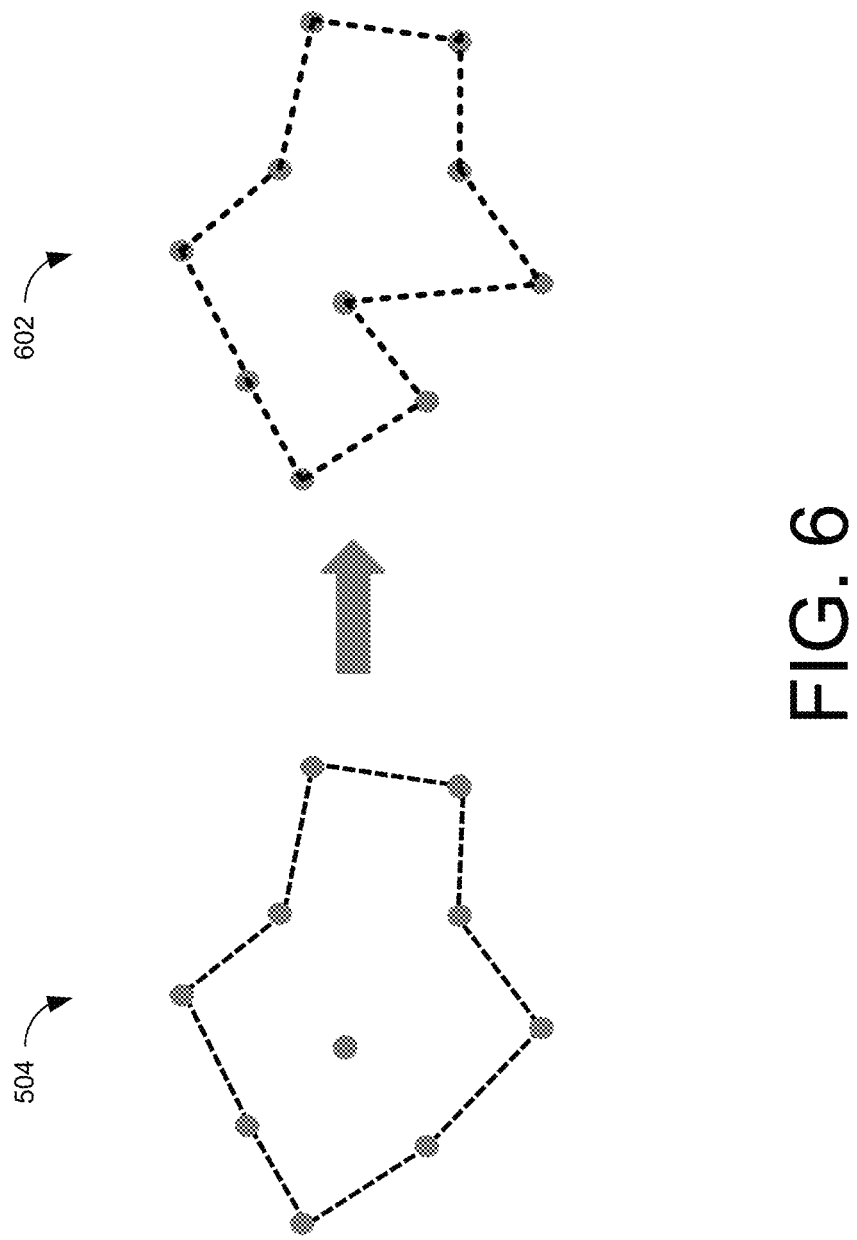
FIG. 6 continues the example of FIG. 5.

FIG. 6 continues the example of FIG. 5. The preliminary solution for the 10-city traveling sales problem is shown at 504. As noted above, this is a fairly good solution, but fails to traverse one of the 10 cities. But being a reasonably good solution, this preliminary solution provides a good starting point for the recursive neural network 104. A final solution provided by the recursive neural network 104 is illustrated at 602. As can be seen, only a small adjustment to the preliminary solution was necessary to achieve the final solution.

Energy minimization searches implement techniques to reduce the energy of the recursive neural network to a global minimum, where the energy of the network represents the states of the nodes in the neural network. In many cases, however, the recursive neural network may converge at a local minimum, rather than at the global minimum. Many techniques are available to prevent convergence at a local minimum. One such solution is simulated annealing by chaos. However, these solutions consume additional resources. The use of a trained deep neural network as a first stage, with the recursive neural network as the second stage, mitigates these problems by starting the recursive neural network closer to the global minimum. Using either a deep neural network or a recursive neural network alone cannot achieve these results.

Figure 7:
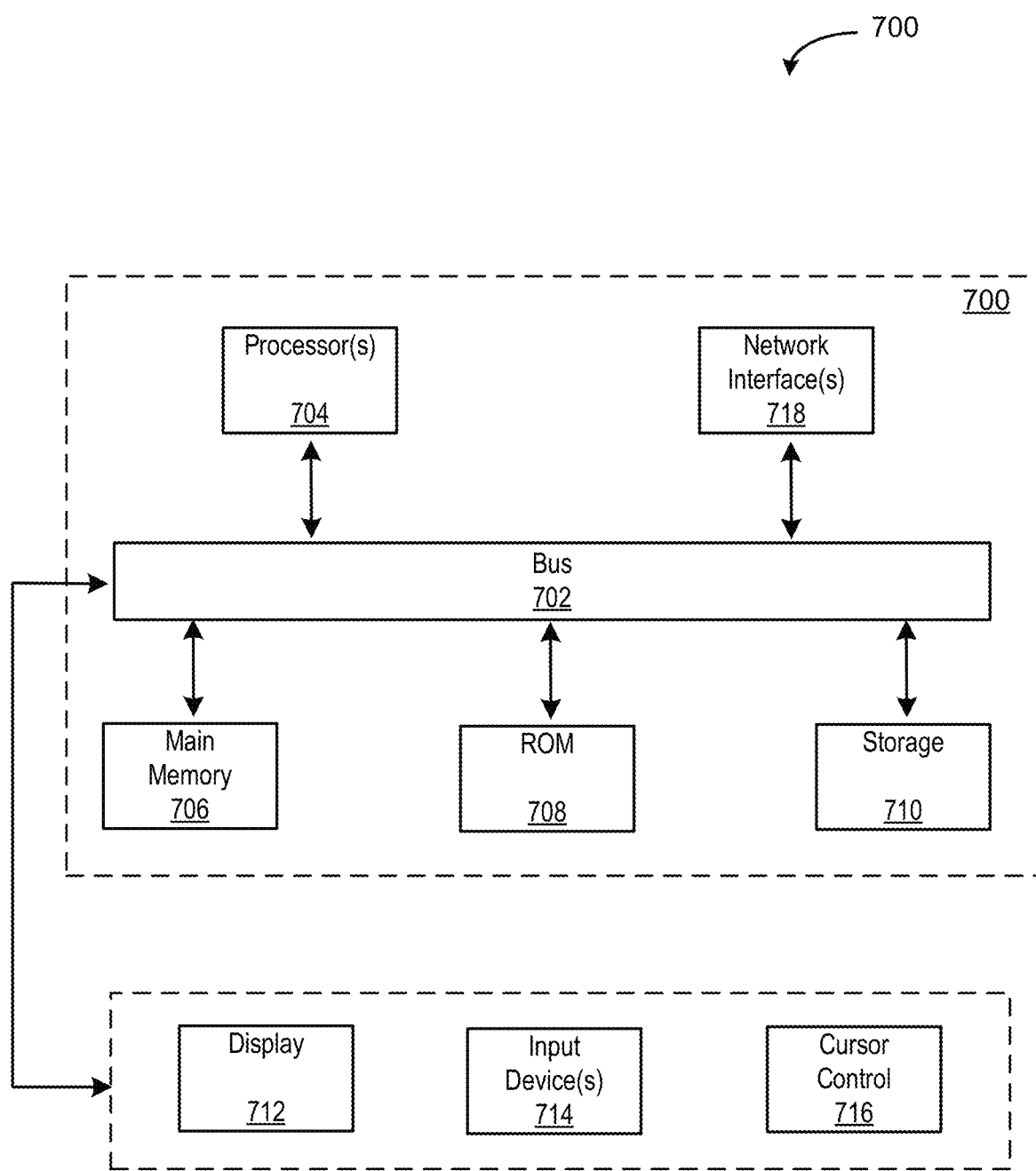
FIG. 7 depicts a block diagram of an example computer system in which various of the embodiments described herein may be implemented.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A deep neural network apparatus for solving a first nondeterministic polynomial-time (NP) hard or NP complete problem, the deep neural network apparatus comprising:
    receiving data from an input circuit of an apparatus operatively connected to the deep neural network;
    train the deep neural network using the data, wherein the data corresponds with a plurality of second NP hard or NP complete problems, and solutions to the second NP hard or NP complete problems, and wherein each of the second NP hard or NP complete problems is similar to the first NP hard or NP complete problem;
    generate a preliminary solution to the first NP hard or NP complete problem using the trained deep neural network;
    transmit the preliminary solution to a neural network interface configured to program a recursive neural network with the preliminary solution;
    the recursive neural network configured to execute an energy minimization search using a classic annealing search, wherein the recursive neural network generates a final solution to the first NP hard or NP complete problem based on the preliminary solution to the first NP hard or NP complete problem; and
    generate the final solution determined by the recursive neural network and based on the preliminary solution to be provided to an output circuit of the apparatus.

2. The apparatus of claim 1, wherein the recursive neural network comprises a Hopfield network.

3. The apparatus of claim 2, wherein the Hopfield network is implemented as a crossbar array of memory elements.

4. The apparatus of claim 3, wherein the memory elements are implemented as memristors.

5. The apparatus of claim 1, wherein the recursive neural network comprises an autoassociative memory.

6. The apparatus of claim 1, wherein the recursive neural network comprises a restrictive Boltzmann machine.

7. The apparatus of claim 1, wherein:
    the deep neural network is further configured to provide one or more parameters to sample from a distribution of the preliminary solution to the neural network interface, and
    the neural network interface is further configured to use the one or more parameters from the distribution in programming the recursive neural network.

8. A system for solving a first nondeterministic polynomial-time (NP) hard or NP complete problem, the system comprising:
    an input circuit;
    an output circuit;
    a hardware processor; and
    a non-transitory machine-readable storage medium encoded with instructions executable by the hardware processor to perform a method comprising:
        identify a plurality of second NP hard or NP complete problems, wherein each of the second NP hard or complete problems is similar to the first NP hard or NP complete problem;
        identify solutions to the second NP hard or NP complete problems;
        receive data from the input circuit of the system operatively connected to a deep neural network;

train the deep neural network using the data, wherein the data corresponds with the plurality of second NP hard or NP complete problems and solutions to the second NP hard or NP complete problems;

generate a preliminary solution to the first NP hard or NP complete problem using the trained deep neural network;

transmit the preliminary solution to a neural network interface, wherein the neural network interface is configured to program a recursive neural network with the preliminary solution;

wherein the recursive neural network executes an energy minimization search using a classic annealing search to generate a final solution to the first NP hard or NP complete problem based on the preliminary solution to the first NP hard or NP complete problem; and generate the final solution determined by the recursive neural network and based on the preliminary solution to be provided to the output circuit of the system.

9. The system of claim 8, wherein the recursive neural network comprises a Hopfield Network.

10. The system of claim 9, wherein the Hopfield network is implemented as a crossbar array of memory elements.

11. The system of claim 10, wherein the memory elements are implemented as memristors.

12. The system of claim 8, wherein the recursive neural network comprises an autoassociative memory.

13. The system of claim 8, wherein the recursive neural network comprises a restrictive Boltzmann machine.

14. A method for solving a first nondeterministic polynomial-time (NP) hard or NP complete problem, the method comprising:

identifying a plurality of second NP hard or NP complete problems, wherein each of the second NP hard or NP complete problems is similar to the first NP hard or NP complete problem;

identifying solutions to the second NP hard or NP complete problems;

receiving data from the input circuit operatively connected to a deep neural network;

training the deep neural network using the data, wherein the data corresponds with the plurality of second NP hard or NP complete problems and solutions to the second NP hard or NP complete problems;

generating a preliminary solution to the first NP hard or NP complete problem using the trained deep neural network;

transmitting the preliminary solution to a neural network interface, wherein the neural network interface is configured to program a recursive neural network with the preliminary solution;

wherein the recursive neural network executes an energy minimization search using a classic annealing search to generate a final solution to the first NP hard or NP complete problem based on the preliminary solution to the first NP hard or NP complete problem; and generating the final solution determined by the recursive neural network and based on the preliminary solution to be provided to an output circuit.

15. The method of claim 14, wherein the recursive neural network comprises a Hopfield network.

16. The method of claim 15, wherein the Hopfield network is implemented as a crossbar array of memory elements.

17. The method of claim 16, wherein the memory elements are implemented as memristors.

* * * * *